United States Patent [19]

Sparacia et al.

[11] Patent Number: 4,631,409
[45] Date of Patent: Dec. 23, 1986

[54] SCINTILLATOR CRYSTAL HAVING A HIGHLY REFLECTIVE SURFACE

[75] Inventors: Frank M. Sparacia, Solon; Oley D. Wimer, Hudson, both of Ohio

[73] Assignee: Harshaw/Filtrol, Cleveland, Ohio

[21] Appl. No.: 596,480

[22] Filed: Apr. 3, 1984

[51] Int. Cl.$^4$ ............................................. G01T 1/20
[52] U.S. Cl. ............................. 250/361 R; 250/368; 250/483.1
[58] Field of Search ............... 250/361 R, 368, 370, 250/371, 483; 252/301.4 R

[56] References Cited

U.S. PATENT DOCUMENTS

| | | | |
|---|---|---|---|
| 4,107,534 | 8/1978 | Pittingsrud | 250/368 |
| 4,110,621 | 8/1978 | Horn | 250/361 R |
| 4,220,860 | 9/1980 | Carlson et al. | 250/361 R |
| 4,267,453 | 5/1981 | Kieboom et al. | 250/368 |
| 4,415,364 | 11/1983 | Naito et al. | 106/74 |

OTHER PUBLICATIONS

Eastman Kodak Company, *Kodak White Reflectance Standard, Kodak White Reflectance Coating*, 1980.

*Primary Examiner*—Janice A. Howell
*Attorney, Agent, or Firm*—Harshaw/Filtrol

[57] ABSTRACT

Scintillators, and more particularly inorganic scintillation crystals such as cadmium tungstate, bismuth germanate, barium fluoride and calcium fluoride are coated with one or more coatings of a highly reflective material such as barium sulfate dispersed in a suitable binder such as sodium silicate to provide a highly reflective surface layer capable of providing internal reflection of scintillation events in the region of 200–700 nm. The reflective surface enhances the pulse height and resolution of the scintillator when coupled to a suitable detector such as a photomultiplier tube or a silicon photodiode.

12 Claims, No Drawings

SCINTILLATOR CRYSTAL HAVING A HIGHLY REFLECTIVE SURFACE

BACKGROUND OF THE INVENTION

This invention relates to scintillators and more particularly it relates to inorganic scintillation crystals of the type characterized as alkali metal halides and inorganic oxides. These crystals are noted for their ability to scintillate or emit pulses of light when exposed to ionizing radiation. When the crystals are optically coupled to a suitable detector, the scintillation events or pulses can be be detected, measured and analyzed for the purpose of characterizing the amount or nature of the radiation energy to which the crystal is exposed.

Some desirable characteristics of inorganic halide and oxide scintillators are their high density for gamma ray stopping power, large pulse height or light output for detection for low energy interactions, and short decay time for rapid counting of scintillation events.

Pulses of light emitted during scintillation are detected by a device such as a photomultiplier tube (PMT) or a silicon photodiode. The effectiveness of the detector in seeing the light flashes within a crystal is dependent upon the number of flashes impinging on the detector. On the other hand, the flashes within the crystal move in random directions and may pass out of the crystal without being detected.

DISCUSSION OF THE PRIOR ART

It has been a common practice to surround a scintillation crystal with a reflective material in contact with all of the crystal surfaces except for the surface optically coupled to the detector. Typically, the crystal is placed in a housing with the space between the housing and crystal being filled with a finely divided reflective powder such as aluminum oxide or magnesium oxide. Alternatively it has been a common practice to wrap the crystal with a reflective substance in an effort to contain the scintillation events within the crystal until detected by the PMT or the diode. To be effective, the powder or the wrapping must be capable of reflecting light having the same wave length as that being emitted by the crystal. Typically, this is in the range of 200-700 nm. Unfortunately, the powder has a tendency to pack or shift in the housing during handling and use, resulting in uneven thickness and density, and non-uniformity in the reflectance characteristics of the powder. Wrapping the crystal with reflective substances is deficient in that it is labor intensive and time consuming.

U.S. Pat. No. 4,107,534 describes coating the entire surface, except for the face plate, of a photomultiplier tube with a layer of highly reflective material such as titanium dioxide in a lacquer base. This improves the light collection efficiency and energy resolution of the PMT.

U.S. Pat. No. 4,110,621 describes coating the surfaces of scintillation crystals such as sodium iodide, bismuth germanate, cesium fluoride and thallium activated cesium iodide with a highly reflective matte layer of a material such as magnesium oxide, calcium carbonate, barium sulfate, or titanium dioxide to a thickness of approximately 0.5 millimeters. The crystal is coupled to the window of a PIN silicon photodiode.

U.S. Pat. No. 4,267,453 describes the use of barium sulfate in acrylic varnish, diluted with a diluent such as spirits and xylene. The material is applied to the surface of a scintillation crystal to provide an adherent reflective layer.

THE SUMMARY OF THE INVENTION

The invention relates to the use of an adherent reflective layer on the exposed surfaces of a scintillator, more particularly an inorganic scintillation crystal or a plastic scintillator, said layer containing particles of barium sulfate dispersed in a sodium silicate binder. The reflective layer reduces the escape or loss of scintillation events before they are noted by the detector associated with the crystal.

As compared to prior art reflective coatings, the use of this novel coating has the following advantages:

(a) It specifically reflects scintillation events in the range of 200-700 nm and thus, is usable on a wide range of scintillators including plastic scintillators and inorganic scintillation crystals.

(b) It utilizes readily available and inexpensive materials that are easy to apply to the scintillator surface.

(c) It eliminates the inconveniences and drawbacks associated with the use of reflective powders packed between a scintillator and its housing.

(d) The use of a sodium silicate binder system securely bonds the barium sulfate to the surface of the scintillator.

(e) This reflective coating does not deleteriously affect the pulse height and resolution of the scintillator.

(f) The coating remains reflective even after thermal cycling at elevated temperatures such as those encountered in well logging operations.

DETAILED DESCRIPTION OF THE INVENTION

The invention relates to a scintillator and more particularly to an inorganic scintillation crystal or a plastic scintillator adapted to be optically coupled to the means for detecting a scintillation event, said scintillator improved by a layer reflecting back into the scintillator, scintillation events being emitted in the 200-700 nm range, said layer consisting of particles of an inorganic reflective material adhered to the surface of the scintillator by the use of a compatible binder.

The invention also comprises the process of providing a reflective layer on the surface of a scintillator comprising applying to the scintillator surface one or more coatings of particles of a reflective material in a compatible binder system. The reflective material comprises between about 90 and 94 weight percent of barium sulfate and between about 10 and 6 weight percent of the compatible binder. Each coating is applied to a thickness of about 1 to 5 mils, with the total thickness of the layer within the range of 3 to 20 mils.

The barium sulfate useful for the teachings of this invention is commercially available in powder form. Since a preferred method of application is air spraying, the powder should be free of agglomerates and should be capable of being readily dispersed in the sodium silicate binder. Although the inorganic reflective powder is comprised primarily of barium sulfate, minor amounts, up to about 10%, of aluminum oxide or magnesium oxide may be blended into the barium sulfate if desired.

The binder comprises between about 6% and about 10% by weight of the combined weight of the powder and binder. If less than 6% binder is used, the coating does not readily adhere to the crystal and can be rubbed off without difficulty. On the other hand, the adhesion remains unaffected as the percent binder is increased above 10%. However, if the crystal will be exposed to elevated temperatures the coating begins to darken, resulting in a loss of reflectance. At the same time the higher levels of binder tend to cause the coating to become hard and brittle when subjected to thermal cycling.

Conventional air spraying equipment can be used to apply the coatings, using compressed air or nitrogen. The use of a small air brush to apply the spray avoids wasteful overspray. Alternatively, airless spraying may be used to apply each of the coatings. The coatings may be applied by dipping or by other appropriate means. One simple method of mounting the scintillator for spraying is to place the scintillator face down on a pedestal, adhered to a piece of double faced adhesive tape mounted on the pedestal. The pedestal may be slowly rotated while the spray coatings are being applied. After the application of each coat of barium sulfate, the coating is dried by appropriate means such as air drying or radiant heat.

The invention is applicable and can be used to improve the detection efficiency of a variety of inorganic halides and oxide scintillation crystals as well as plastic scintillators. Although crystals such as NaI(Tl) and CsI(Na) are good scintillators, they also are hygroscopic and cannot be directly coated with the reflective layer of the present invention primarily because water of hydration which forms on the crystal surface impedes formation of a good bond between the reflective layer and the crystal. However, the reflective coating can be applied to a suitable reflector plate such as a stainless steel or aluminum plate or aluminum foil, to a thickness of approximately 20 mils. After the coating is completely dry, it can then be pressed against, or wrapped around the hygroscopic crystal to provide a highly reflective surface.

The invention is applicable to a wide variety of inorganic non-hygrosopic halides and oxides. The inorganic and non-hygroscopic halides include $BaF_2$, $CaF_2(Eu)$, $CsI(Tl)$ and $TlCl(Be,I)$. The inorganic oxide crystals are typified by $Bi_4Ge_3O_{12}$, $CaWO_4$ and $CdWO_4$. Unquestionably, the reflective layer of the present invention can be applied to other inorganic halide and oxide scintillation crystals in addition to those specified. Before application of the reflective layer, it is important for the crystal surface to be thoroughly cleaned by suitable means such as alcohol and/or water.

The following example is intended to illustrate a preferred embodiment of the invention.

EXAMPLE I

The inorganic reflective coating of the present invention is prepared by mixing together the following:
Barium Sulfate Powder—Commercial Grade—150 gm
Distilled Water—90 gm
Sodium Silicate—Technical Grade—14 gm The mixture is sprayed on to a small stainless steel plate using an air brush. In Sample 1 the coating is air dried with no subsequent treatment. In Sample 2 the dried coating is heat treated for 2 hours to 400° C., and no loss of whiteness or adhesion is noted. In Sample 3 the coating is applied in four separate applications with a drying step between each application, and is then heat treated to 250° C. for about 2 hours, again with no degradation or darkening of the coating.

Sample 4 comprised a coating of $Al_2O_3$ in a sodium silicate binder, the ratio of powder to binder being approximately 60/40.

The samples are compared for diffuse reflection in a Perkins Elmer Model 330 Spectrophotometer with an integrating sphere reflectance attachment. A pressed aluminum disk is used as a standard of comparison. Table 1 shows the comparative results in the range of 400 to 600 nanometers.

TABLE 1

| Range | Sample No. | | | |
|---|---|---|---|---|
| | #1 | #2 | #3 | #4 |
| 400 nm | 98% | 92% | 94% | 92% |
| 450 nm | 97% | 93 | 95 | 91 |
| 500 nm | 96+ | 93 | 95 | 90 |
| 550 nm | 96 | 94 | 95+ | 90 |
| 600 nm | 94+ | 93 | 95 | 88+ |

Within the experimental margin of error it can be seen that the exposure of the samples to high temperatures results in some deterioration in the reflectivity of the coating, as shown by a comparison of Samples 2 and 3 with Sample 1. However, by applying the coating in a series of applications, as in Sample 3, the reflectivity closely approximates that of the one step coating in Sample 1 even though the former was subjected to thermal treatment at 250° C. while the latter was not.

We claim:

1. An inorganic scintillation crystal selected from the group consisting of inorganic halides and inorganic oxides wherein the crystal emits light pulses in the 200–700 nm range when the crystal is subjected to ionizing crystal is subjected to ionizing radiation, said crystal having at least one surface coated with a reflective layer capable of reflecting said light pulses back into the crystal, said layer comprising particles of barium sulfate and a binder consisting essentially of sodium silicate.

2. The crystal according to claim 1 wherein the sodium silicate comprises between about 6% and 10% by weight of the reflective layer.

3. The scintillator of claim 1 wherein the surface layer has a thickness of between about 3 and about 20 mils.

4. The crystal of claim 1 wherein the inorganic halides are selected from the group consisting of $BaF_2$, $CaF_2(Eu)$, $CsI(Tl)$ and $TlCl(Be,I)$.

5. The crystal of claim 4 wherein the oxides are selected from the group consisting of $Bi_4Ge_3O_{12}$, $CaWO_4$, and $CdWO_4$.

6. A process of providing a highly reflective layer of barium sulfate particles adhered to the surface of a scintillator comprising coating the surface of the scintillator with the particles dispersed in a binder consisting of sodium silicate.

7. The process of claim 6 wherein the particles are deposited on the surface in a plurality of separate applications.

8. The process of claim 7 including a drying step between each application.

9. The process of claim 6 wherein the coatings are applied to the surface by spraying.

10. The process of claim 9 wherein the particles are deposited to a thickness of between about 1 and about 3 mils in each application.

11. For use in providing a highly reflective layer on the surface of a scintillator, a coating system comprising a dispersion of particles of barium sulfate in a sodium silicate binder wherein the barium sulfate is present in an amount of between 90 and 94 weight percent and the binder is present in an amount of between 6 and 10%.

12. The coating system of claim 11 in which up to 10% of the barium sulfate is replaced with particles of a second inorganic reflective material selected from the group consisting of aluminum oxide and magnesium oxide.

* * * * *